(12) United States Patent
Yamamoto et al.

(10) Patent No.: US 11,499,542 B2
(45) Date of Patent: Nov. 15, 2022

(54) ELECTRIC PUMP

(71) Applicants: AISIN CORPORATION, Kariya (JP); TOYOTA JIDOSHA KABUSHIKI KAISHA, Toyota (JP)

(72) Inventors: Takeru Yamamoto, Kariya (JP); Ryota Obana, Kariya (JP); Tomoya Ishii, Kariya (JP); Motoki Takeno, Nisshin (JP)

(73) Assignees: AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 52 days.

(21) Appl. No.: 16/724,962

(22) Filed: Dec. 23, 2019

(65) Prior Publication Data

US 2020/0200166 A1    Jun. 25, 2020

(30) Foreign Application Priority Data

Dec. 25, 2018 (JP) .............................. JP2018-241301

(51) Int. Cl.
*F04B 49/06* (2006.01)
*F04B 17/03* (2006.01)
*H02P 6/28* (2016.01)

(52) U.S. Cl.
CPC .............. *F04B 49/06* (2013.01); *F04B 17/03* (2013.01); *F04B 49/065* (2013.01); *H02P 6/28* (2016.02);
(Continued)

(58) Field of Classification Search
CPC ........ F04B 49/06; F04B 49/065; F04B 17/03; F04B 2203/0201; F04B 2203/0202;
(Continued)

(56) References Cited

U.S. PATENT DOCUMENTS 5,842,454 A    12/1998  Miwa et al.
6,975,087 B1   12/2005  Crabill et al.
(Continued)

FOREIGN PATENT DOCUMENTS

CN    103973190 A    8/2014
CN    104912793 A    9/2015
(Continued)

OTHER PUBLICATIONS

Office Action issued in corresponding Japanese Patent Application No. 2018-241301, dated Nov. 10, 2020, with English Translation (5 pages).
(Continued)

*Primary Examiner* — Peter J Bertheaud
(74) *Attorney, Agent, or Firm* — Buchanan Ingersoll & Rooney PC

(57) ABSTRACT

An electric pump includes a pump unit, a motor and a controller. The pump unit is configured to pump fluid by a rotating operation. The motor is a brushless direct-current motor and configured to rotationally drive the pump unit. The controller is configured to control a current to be supplied to the motor. The controller is configured to switch between voltage control for controlling the current to be supplied to the motor based on a target voltage and current control for controlling the current to be supplied to the motor based on a target current.

4 Claims, 4 Drawing Sheets

(52) U.S. Cl.
CPC ........... *F04B 2203/0201* (2013.01); *F04B 2203/0202* (2013.01); *F04B 2203/0401* (2013.01); *F04B 2203/0402* (2013.01)

(58) Field of Classification Search
CPC ...... F04B 2203/0401; F04B 2203/0402; H02P 6/28; H02P 7/08
See application file for complete search history.

(56) References Cited

U.S. PATENT DOCUMENTS

| | | |
|---|---|---|
| 9,401,670 B2 * | 7/2016 | Minato ................. F04B 49/06 |
| 2010/0270095 A1 | 10/2010 | Shono et al. |
| 2014/0210391 A1 | 7/2014 | Bozic et al. |
| 2015/0263653 A1 | 9/2015 | Minato |

FOREIGN PATENT DOCUMENTS

| | | |
|---|---|---|
| JP | 2004166436 A | 6/2004 |
| JP | 2015175290 A | 10/2015 |
| WO | 2009/082010 A1 | 7/2009 |

OTHER PUBLICATIONS

Office Action issued in corresponding Chinese Patent Application No. 201911324140.3, dated Sep. 23, 2022 (7 pages).

\* cited by examiner

ELECTRIC PUMP

CROSS-REFERENCE TO RELATED APPLICATION

This application claims priority to Japanese Patent Application No. 2018-241301 filed on Dec. 25, 2019, incorporated herein by reference in its entirety.

BACKGROUND

1. Technical Field

The present disclosure relates to an electric pump.

2. Description of Related Art

Japanese Unexamined Patent Application Publication No. 2015-175290 (JP 2015-175290 A) discloses an electric pump including a controller capable of switching a motor between constant current control and constant voltage control.

Furthermore, Japanese Unexamined Patent Application Publication No. 2004-166436 (JP 2004-166436 A) discloses a control device that controls a brushless direct-current (DC) motor by any one of current feedback control and rotation speed control.

SUMMARY

The constant voltage control disclosed in JP 2015-175290 A performs control such that a voltage value of power supplied to the motor is kept constant. As a result, when the load increases, the current value supplied to the motor increases, and in some cases, may exceed the current value that can be allowed by a system including the motor.

In addition, in the current feedback control disclosed in JP 2004-166436 A, since current consumption is suppressed to a certain value when the motor is driven with a high load, the rotation speed of the motor is lower, and thus the motor may be stepped out.

The present disclosure is to provide an electric pump capable of suppressing inconvenience of supplying an excessive current in a situation where a load of a motor increases, without sacrificing the effectiveness of voltage control.

An aspect of the present disclosure relates to an electric pump. The electric pump includes a pump unit, a motor, and a controller. The pump unit is configured to pump fluid by a rotating operation. The motor is a brushless direct-current (DC) motor and is configured to rotationally drive the pump unit. The controller is configured to control a current to be supplied to the motor. The controller is configured to switch between voltage control for controlling the current to be supplied to the motor based on a target voltage and current control for controlling the current to be supplied to the motor based on a target current.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, embodiments of the present disclosure will be described with reference to the accompanying drawings.

Basic Configuration

Figure 1:
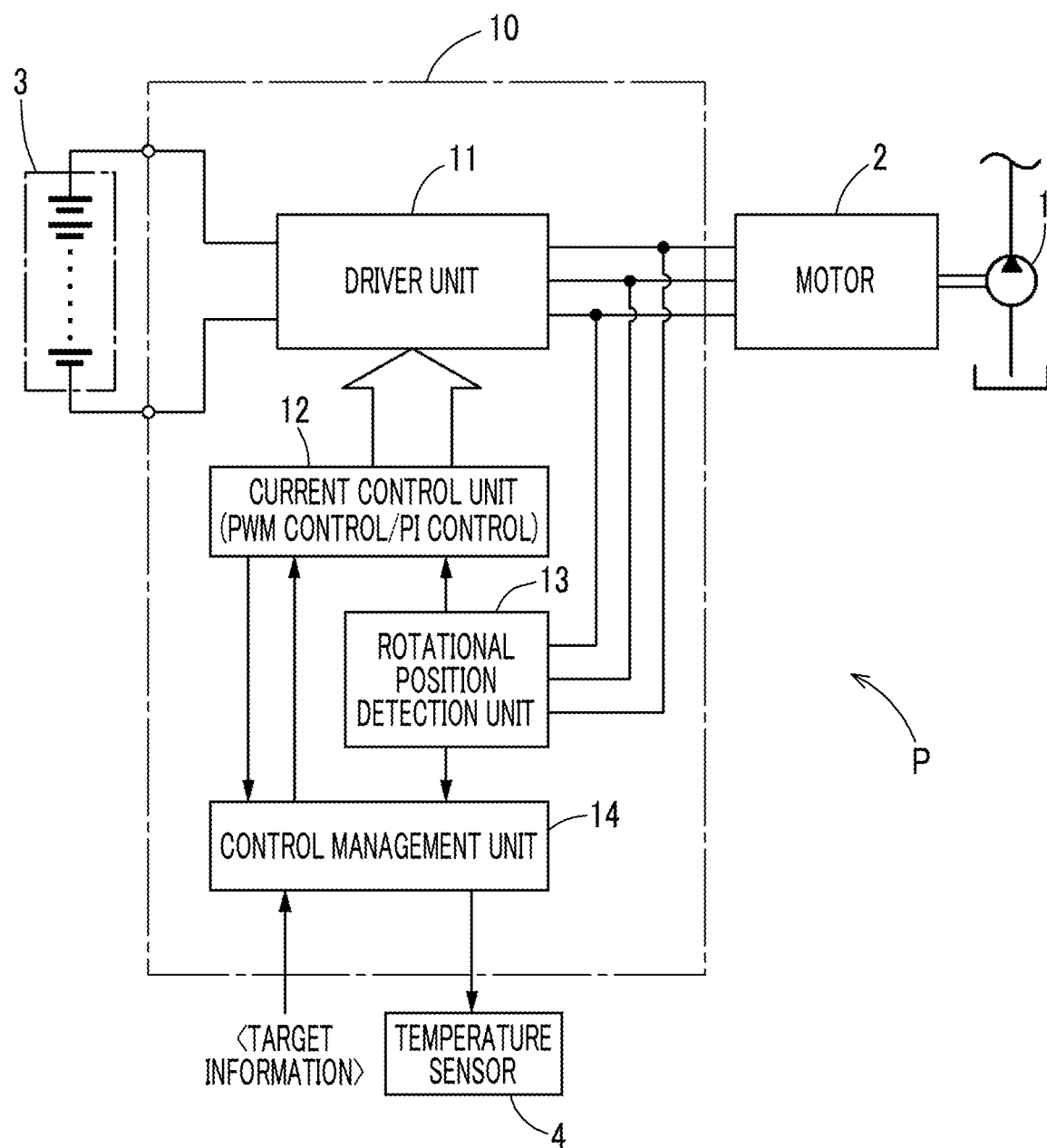
FIG. 1 is a block diagram showing a configuration of an electric pump.

As shown in FIG. 1, an electric pump P is configured to include a pump unit 1 that pumps fluid by rotating operation, a brushless direct-current (DC) motor 2 that rotationally drives the pump unit 1, and a controller 10 that controls current to be supplied to the motor 2.

The electric pump P may be used, for example, for supplying oil stored in a transmission case or the like in a traveling drive system of a vehicle. The electric pump P supplies current supplied from a DC power source 3 formed of a battery provided in the vehicle to the motor 2 through a controller 10. The fluid supplied by the electric pump P is not limited to oil, and may be a liquid such as coolant.

The motor 2 includes field coils, which is common to a three-phase motor in configuration, and a rotor (not shown) having a permanent magnet that is rotated by the magnetic force acting from the field coils, and the pump unit 1 is driven by a driving force of the rotor. In addition, the motor 2 is a sensorless-type motor that does not have a sensor for detecting a rotational position of the rotor.

Controller

As shown in FIG. 1, the controller 10 includes a driver unit 11, a current control unit 12, a rotational position detection unit 13 and a control management unit 14.

The driver unit 11 has a plurality of field effect transistors (FETs) which is controlled to be in an ON state when a current is supplied to the motor 2. The current control unit 12 has a driving circuit that generates a control signal with a target duty ratio corresponding to a target driving voltage by a pulse-width modulation (PWM) technology and individually drives the FETs of the driver unit 11 at the timing synchronized with a detection signal of the rotational position detection unit 13. The current control unit 12 is configured to perform vector control.

The rotational position detection unit 13 the rotational position of the rotor from the induction voltage generated by each of coils of the motor 2 when the rotor rotates.

The control management unit 14 is configured to set an upper limit value Dmax and a lower limit value Dmin of the FET driving duty ratio by PWM, based on temperature information of the transmission case, target information, the power supply voltage, the power supply current, and the like, and to allow the control of the motor 2 to be switched between the voltage control and the current control. The temperature information of the transmission case is sensed by a temperature sensor 4, and the target information includes a target amount of oil to be supplied.

In the controller 10, the driver unit 11, the current control unit 12 and the rotational position detection unit 13 are implemented by hardware, and the control management unit 14 is implemented by a combination of hardware and software.

Control Process

As shown in a flowchart of FIG. 2, the control management unit 14 performs a control on the pump unit 1 (hereinafter referred to as 'pump control'). In the pump control, control information is acquired, and FET driving Duty is calculated (steps S101 and S102).

In the control, control information is a target oil discharge amount of oil per unit time, temperature information acquired by the temperature sensor 4, or the like. Particularly, in step S102, a graph is illustrated in which a value of the FET driving duty ratio Dsig is acquired from a predetermined characteristic line L based on an input signal as the control information, where a horizontal axis represents the input value (the unit is duty ratio (%)) and a vertical axis represents the FET driving Duty (the unit is duty ratio (%)).

In addition, the FET driving Duty is a driving signal with the duty ratio of PWM when the field coils of the motor 2 are actually driven by the current control unit 12 driving the FETs of the driver unit 11.

Next, based on the signal from the rotational position detection unit 13, when the rotational position of the rotor is detected, the rotation speed of the rotor is acquired and the approximate rotation speed of the rotor is calculated, and based on the approximate rotation speed, processing of determining the operation mode is performed (steps S103 to S107).

It is necessary that the rotor of the motor 2 is in a rotating state to detect the rotation of the rotor in step S104. In addition, in step S105, the rotation speed per unit time is calculated, and in step S106, the approximate rotation speed is calculated.

The approximate rotation speed is assumed to be a value that may not be affected by variation in the rotation speed acquired in real time. For example, a value of the average rotation speed within a set time, the moving average, a value obtained by rounding off a numerical value of a predetermined digit, or the average value of the rotation speed of the rotor acquired at a predetermined interval.

In the processing of determining the mode (step S107), for example, in a situation where the approximate rotation speed is less than 800 rpm as a second set value, such as immediately after the rotor of the motor 2 starts rotating from a standstill state or when the rotor continues to rotate at a low rotation speed, the non-restriction mode Ma is selected and determined as the operation mode. On the other hand, after the approximate rotation speed of the rotor is equal to or greater than 800 rpm, the restriction possible mode Mb is selected and determined as the operation mode.

The non-restriction mode Ma is a mode in which the upper limit of the FET driving Duty can be set to 100% and voltage control is performed. The restriction possible mode Mb is a mode in which the upper limit of the FET driving Duty is set to be less than 100%, voltage control is performed until the FET driving Duty reaches the upper limit, and the FET driving Duty is maintained at the upper limit by current control when the FET driving Duty is equal to or greater than the upper limit.

Particularly, in this control, after the restriction possible mode Mb is selected, the restriction possible mode Mb is maintained, for example, until the approximate rotation speed falls below 500 rpm as a third set value. In addition, when the approximate rotation speed falls below 500 rpm, the non-restriction mode Ma is selected as the operation mode, and the non-restriction mode Ma is maintained until the approximate rotation speed reaches 800 rpm or more. By setting the hysteresis in this way, the inconvenience of frequently switching the mode is suppressed.

500 rpm (third set value) and 800 rpm (second set value) are values set when the specific electric pump P is controlled, and any values can be set as the rotation speed for determining the operation mode. For example, the switching between the non-restriction mode Ma and the restriction possible mode Mb may be performed all at 500 rpm (first set value).

Next, when rotation of the rotor is not detected in step S104, and after the processing of determining the mode in step S107 has been performed, information on the driver unit 11 is acquired (step S108), a motor control routine is executed (step S200), and then processes from step 101 are repeated unless the entire control is reset.

Figure 3:
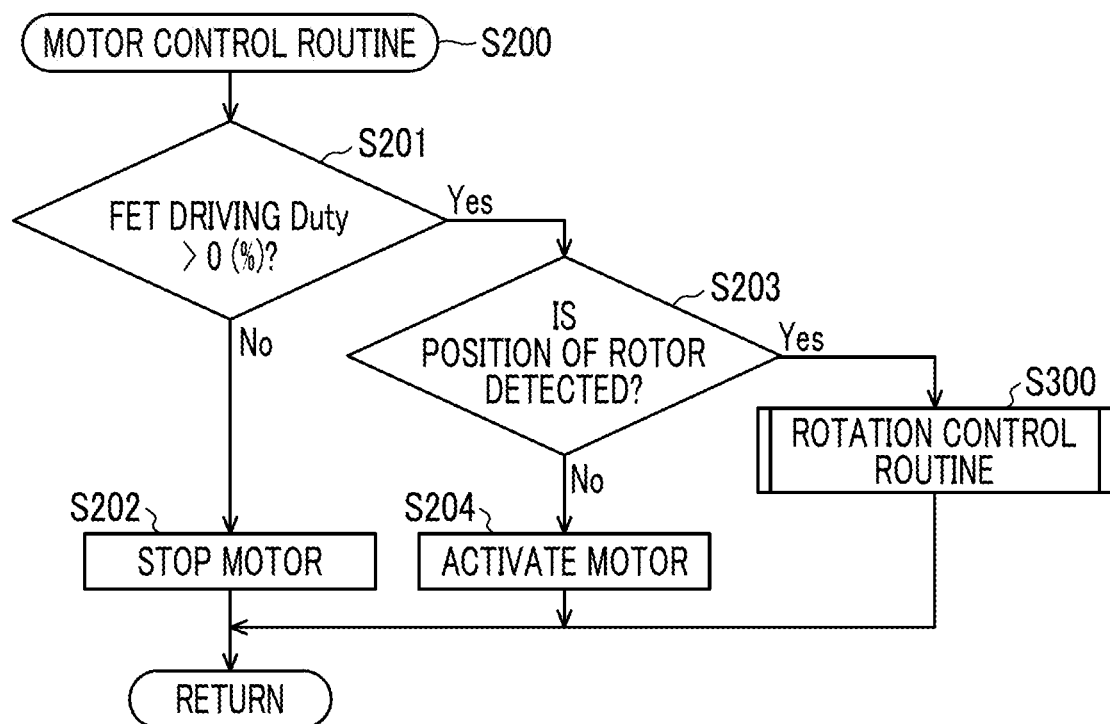
FIG. 3 is a flowchart of a motor control routine.

The motor control routine (step S200) is set as a subroutine, and a control process thereof is shown as a flowchart in FIG. 3.

FET control information is information indicating an output status of the drive signal output from the current control unit 12 to the driver unit 11 when the field coil of the motor 2 is actually driven, and as shown in FIG. 3, when the FET driving Duty from the FET control information is not greater than 0% (No in step S201), the motor 2 is maintained in a standstill state (steps S201 and S202).

Next, in step S201, when FET driving Duty exceeds 0% (Yes in S201), determination is further made whether or not the position of the rotor can be detected in the motor 2. When the determination is that the position of the rotor is not detected (No in S203), the motor 2 is activated (steps S203, S204).

When the position of the rotor is detected in step S203 (Yes in S203), since the rotor is already in the rotating state, a rotation control routine (step S300) is executed.

Figure 4:
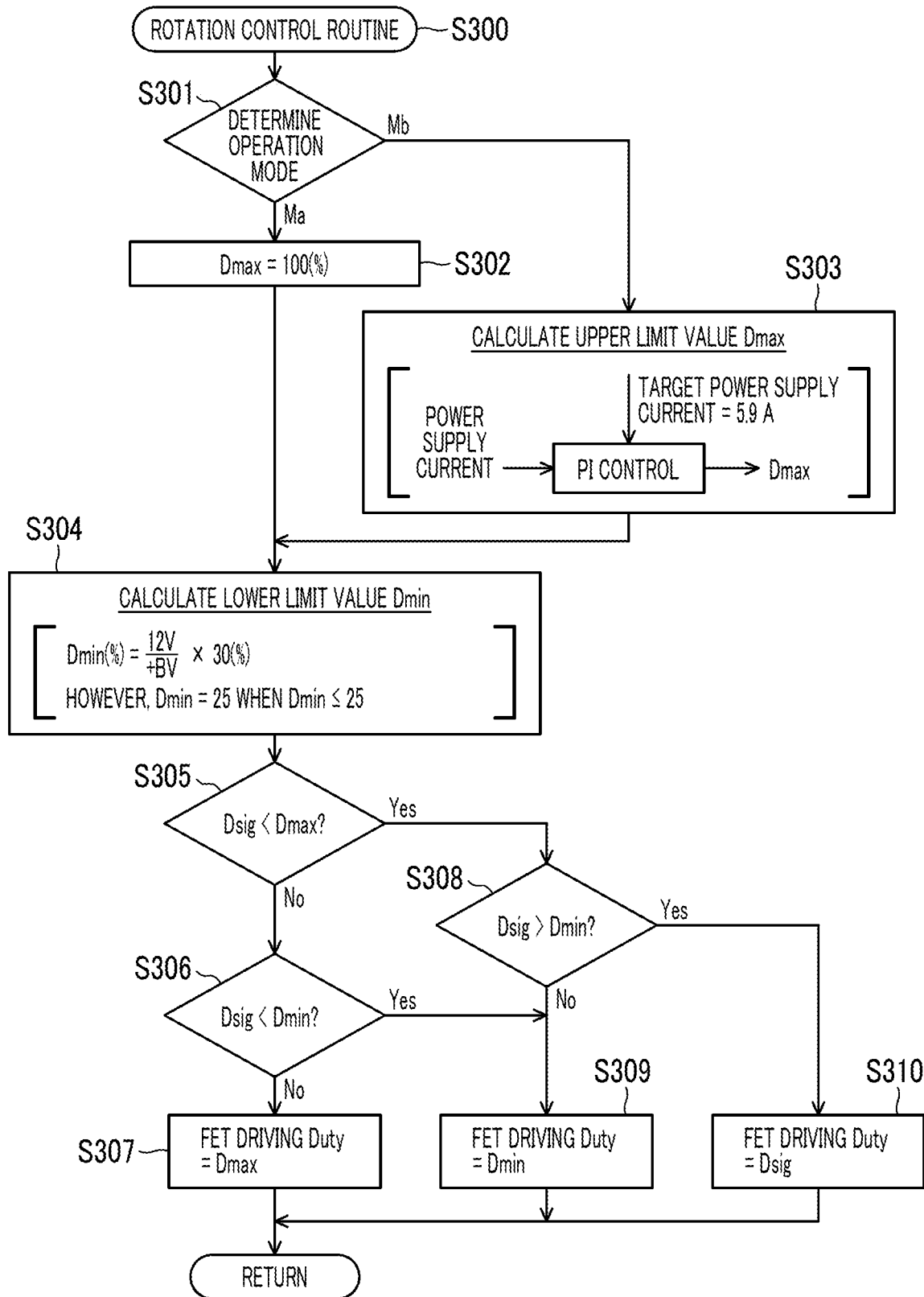
FIG. 4 is a flowchart of a rotation control routine.

The rotation control routine (step S300) is established as a subroutine in the motor control routine (step S200), a control process thereof is shown as a flowchart in FIG. 4.

As shown in FIG. 4, in the rotation control routine (step S300), the operation mode of the motor 2 is determined. When the operation mode is the non-restriction mode Ma, the upper limit of the FET driving Duty is set to be 100% (steps S301, S302). On the other hand, when the operation mode is the restriction possible mode Mb, the upper limit of the FET driving Duty is obtained by calculation (steps S301, S303).

In the non-restriction mode Ma, since the rotor is in a state of rotating at a low speed, the upper limit of the FET driving Duty is set to be 100% in step S302, thereby making it possible for the rotor to rotate at a high speed.

On the other hand, in step S303, since the rotor is in a state of rotating at a high speed, when the target power supply current value of the current to be supplied to the motor 2 is set to, for example, 5.9 A, the value of the FET driving Duty, which is set in PI control, is obtained by calculation, and the obtained duty is stored as the upper limit value Dmax in the control management unit 14, shown in step S303.

Step S303 is an example of a processing form of setting the upper limit value Dmax, and the target power supply current is not limited to 5.9 A and any value can be set. In addition, as s process for obtaining the upper limit value Dmax, the upper limit value Dmax may be obtained from table data in which a plurality of pieces of information is stored.

The upper limit value Dmax set in this way is a duty ratio corresponding to the limit value of the current value to be supplied to the motor 2 in the restriction possible mode Mb, and enables the current control in which the current to be supplied to the motor 2 does not exceed the limit value, as described below.

Then, after the upper limit value Dmax of the FET driving Duty is set in steps S302, S303, the lower limit value Dmin (%) of the FET driving Duty is set by calculation (step S304).

In step S304, the power supply voltage value (12 V) is divided by a predetermined voltage value (BV), and multiplied by 30% to obtain the lower limit value Dmin. When the lower limit value Dmin is equal to or less than 25% (that is, Dmin 25(%)) as a result from the calculation, the lower limit value Dmin is set to be 25(%).

Step S304 is an example of a processing form of setting the lower limit value Dmin. The equation is not limited to that shown in S304, and the numerals used for calculation can be any numerical value.

Next, when Dsig<Dmax is not satisfied from the result of comparison between the value Dsig (FET driving Duty) calculated in step S102 and the upper limit value Dmax (No in S305), and furthermore, when Dsig<Dmin is not satisfied from the result of comparison between the value Dsig and the lower limit value Dmin (No in S306), the upper limit value Dmax is set to the FET driving Duty (steps S305 to S307).

In this way, the upper limit value Dmax set in step S302 or S303 is provided to the current control unit 12 as the FET driving Duty, and the driver unit 11 is driven with the duty ratio of the upper limit value Dmax.

On the other hand, when Dsig<Dmax is satisfied in step S305 (Yes in S305), the value Dsig is further compared with the lower limit value Dmin. As a result, when Dsig>Dmin is not satisfied (No in S308) or when Dsig<Dmin is satisfied in S306 (Yes in S306), the lower limit value Dmin is set to the FET driving Duty (steps S306, S308 and S309).

In this way, the lower limit value Dmin set in S304 is provided to the current control unit 12 as the FET driving Duty, and the driver unit 11 is driving with the lower limit value Dmin.

Further, when Dsig>Dmin is satisfied in step S308 (Yes in S308), the value Dsig is set to the FET driving Duty (step S310).

In this way, the value Dsig calculated in step S102 is provided to the current control unit 12 as the FET driving Duty, and the driver unit 11 is driven with the value Dsig.

Voltage Control and Current Control

In the electric pump P, the oil discharge amount needed for the pump unit 1 is obtained by the voltage control which sets the FET driving Duty corresponding a target voltage for reaching the current to be supplied to the motor 2 based on the target information transmitted from the outside or the measurement value of the temperature sensor 4, in the control management unit 14.

The control management unit 14 always performs the voltage control when the drive mode is in the non-restriction mode Ma. In addition, even when the drive mode is in the restriction possible mode Mb, the voltage control is performed when a drive signal having a duty ratio not exceeding the upper limit value Dmax set in step S303 of the flowchart shown in FIG. 4 is set to the FET driving Duty.

Figure 2:
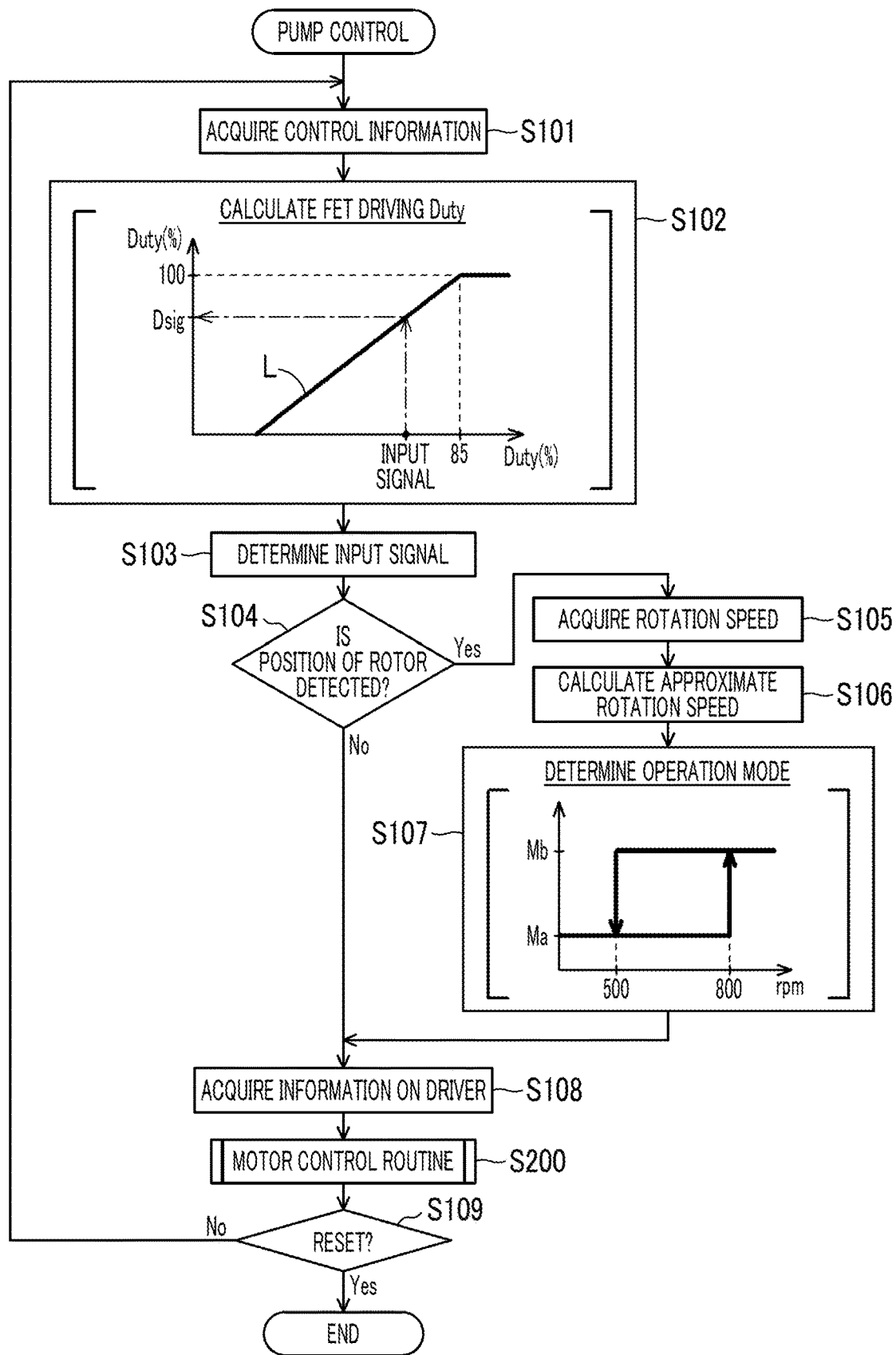
FIG. 2 is a flowchart of pump control.

On the other hand, when the value Dsig set in step S102 shown in the flowchart of FIG. 2 exceeds the upper limit value Dmax set in step S303 shown in the flowchart of FIG. 4, the FET driving Duty is set to the upper limit value Dmax equal to the duty ratio corresponding to the limit value of the current to be supplied to the motor 2. This is the current control.

That is, since in step S303 shown in the flowchart of FIG. 4, the duty ratio, which is set when the PI control is performed to supply the target power supply current (current of 5.9 A in the embodiment) to the field coil of the motor 2, is calculated as the upper limit value Dmax, the FET driving Duty does not exceed the upper limit value Dmax regardless of the value Dsig, and the current control is implemented.

Operational Effect of Embodiment

Through the voltage control, for example, the voltage control converting the current from the DC power source 3 into a target voltage by pulse-width modulation (PWM) and supplying it to the brushless DC motor 2, the rotation speed of the brushless DC motor 2 is easily controlled.

Further, for example, in a situation where the load acting on the pump unit 1 increases and the current value to be supplied to the field coil of the motor 2 increases, the upper limit of the current value to be supplied to the motor 2 is determined by performing the current control, and the inconvenience of supplying an excessive current to the motor can be suppressed.

In the electric pump P, since switching between the non-restriction mode Ma and the restriction possible mode Mb is performed based on the rotation speed of the rotor of the motor 2, it is possible to continuously supply the current to the motor 2 by the voltage control even in a situation where the load acting on the motor 2 varies somewhat, and to suppress the step-out of the motor.

Other Embodiments

In addition to the embodiment described above, the applicable embodiment may be configured as follows (components having the same functions as those in the above embodiment are given the same numerals and signs as those in the embodiment).

In the embodiment, the control process of the current control for setting the upper limit value Dmax is set such that the current to be supplied to the motor 2 does not exceed the limit value. However, it is also possible, for example, to provide a current sensor for detecting the current value to be supplied to the field coil of the motor 2 and set the control process of the current control so as to control the current to be supplied to the field coil based on a detection value of the current sensor.

In the configuration in which the current sensor is used as described above, since the current value which is actually supplied to the field coil of the motor 2 can be acquired, and thus the control accuracy can be improved.

As another modification, for example, when the current control is performed without using the current sensor as described in the embodiment, the control process may be set to implement the current control by setting the upper limit value Dmax and the lower limit value Dmin corresponding to the values of the input signal such that the current control is performed when the value of the input signal exceeds a preset value.

As yet another modification, when the upper limit value Dmax is calculated in step S303 shown in FIG. 4, it is also conceivable to reflect the resistance of the field coil from the temperature of the field coil of the motor 2 in the calculation. That is, since the electric resistance of the field coil varies depending on the temperature, for example, by setting a processing form such that the resistance to the temperature is referred to in table data or the like, it is possible to increase the accuracy of the upper limit value Dmax.

The present disclosure can be employed for an electric pump including a pump unit that is driven by a motor.

With the electric pump according to the aspect of the present disclosure, it is possible to easily control the rotation speed (the number of revolutions per unit time) of the brushless DC motor by the voltage control, for example, by converting the current from the power source into a target voltage by pulse-width modulation (PWM) and supplying the converted target voltage to the brushless DC motor. Further, for example, when the load acting on the pump unit increases, it is possible to suppress inconvenience of supplying an excessive current to the motor by controlling the current to be supplied to the motor by the current control. Therefore, it is possible to suppress the supply of an excessive current in a situation where a load of a motor increases, without sacrificing the effectiveness of voltage control.

In the electric pump according to the aspect of the present disclosure, the controller may be configured to select, as an operation mode, one of a restriction possible mode for performing control by switching between the voltage control and the current control and a non-restriction mode for performing only the voltage control.

With the electric pump according to the aspect of the present disclosure, when determination is made to select the restriction possible mode as the operation mode, it is possible to suppress supply of the excessive current to the motor, for example, by switching the control to the current control when the load acting on the motor increases. On the other hand, by making determination to select the non-restriction mode as the operation mode, it is possible to continuously supply current to the motor, for example, even in a situation where the load acting on the motor varies somewhat. In this way, it is possible to suppress great reduction in the discharge amount of the fluid in the pump unit and step-out of the motor.

In the electric pump according to the aspect of the present disclosure, the controller may set an upper limit current value to be supplied to the motor to a limit value in the restriction possible mode. The controller may be configured to, in the restriction possible mode, perform the voltage control in a situation where the current to be supplied to the motor is less than the limit value. The controller may be configured to, in the restriction possible mode, supply the current less than the limit value to the motor by the current control, instead of the voltage control, in a situation where the current to be supplied to the motor is equal to or greater than the limit value.

With the electric pump according to the aspect of the present disclosure, the setting of the limit value in advance makes it possible to perform the voltage control when the current to be supplied to the motor is less than the limit value, and to supply the current less than the limit value by the current control, instead of the voltage control, in the situation where the current to be supplied to the motor is equal to or greater than the limit value. That is, just by setting the upper limit current value supplied to the motor to the limit value, switching from the voltage control to the current control can be automatically performed, and in the current control, the current exceeding the limit value is not supplied to the motor.

In the electric pump according to the aspect of the present disclosure, the controller may be configured to select the non-restriction mode when a rotation speed of the motor per unit time is less than a first set value. The controller may be configured to select the restriction possible mode when the rotation speed is equal to or greater than the first set value.

With the electric pump according to the aspect of the present disclosure, the controller selects the non-restriction mode as the operation mode when the rotation speed of the motor per unit time is less than the first set value. For this reason, it is possible to supply a sufficient current and to suppress the speed reduction and suppress the step-out with regard to the motor, even when the motor rotates at a low speed. In contrast, the operation mode is determined to be the restriction possible mode when the rotation speed of the motor per unit time is equal to or greater than the first set value. For this reason, for example, when the current to be supplied to the motor rises to the limit value during performing the voltage control, it is possible to suppress the supply of the excessive current exceeding the limit value to the motor by switching to the current control. Particularly, the operation mode shifts to the non-restriction mode when the rotation speed falls below the first set value during performing control in the restriction possible mode. In this way, it is possible to supply the current exceeding the limit value, and thus to suppress the step-out of the motor.

In the electric pump according to the aspect of the present disclosure, the controller may be is configured to select the restriction possible mode when a rotation speed of the motor per unit time is equal to or greater than a second set value in a situation that the operation mode is the non-restriction mode. The controller may be configured to select the non-restriction mode when the rotation speed falls below a third set value that is smaller than the second set value in a situation that the operation mode is the restriction possible mode.

With the electric pump according to the aspect of the present disclosure, the operation mode shifts to the restriction possible mode when the rotation speed of the motor per unit time is equal to or greater than the second set value in a situation of the non-restriction mode. In this way, it is possible to appropriately perform the switching between the non-restriction mode and the restriction possible mode.

What is claimed is:

1. An electric pump comprising:
    a pump unit configured to pump fluid by a rotating operation;
    a brushless direct-current motor configured to rotationally drive the pump unit; and
    a controller configured to control a current to be supplied to the motor, the controller being configured to switch between voltage control for controlling the current to be supplied to the motor based on a target voltage and current control for controlling the current to be supplied to the motor based on a target current, wherein
    the controller is configured to, based on a rotation speed of the motor per unit time, select, as an operation mode, one of a restriction possible mode for performing control by switching between the voltage control and the current control and a non-restriction mode for performing only the voltage control.

2. The electric pump according to claim 1, wherein:
    the controller sets an upper limit current value to be supplied to the motor to a limit value in the restriction possible mode;
    the controller is configured to, in the restriction possible mode, perform the voltage control in a situation where the current to be supplied to the motor is less than the limit value; and
    the controller is configured to, in the restriction possible mode, supply the current less than the limit value to the motor by the current control, instead of the voltage control, in a situation where the current to be supplied to the motor is equal to or greater than the limit value.

3. The electric pump according to claim 2, wherein:
    the controller is configured to select the non-restriction mode when the rotation speed of the motor per unit time is less than a first set value; and
    the controller is configured to select the restriction possible mode when the rotation speed is equal to or greater than the first set value.

4. The electric pump according to claim 2, wherein:
the controller is configured to select the restriction possible mode when the rotation speed of the motor per unit time is equal to or greater than a second set value in a situation that the operation mode is the non-restriction mode; and
the controller is configured to select the non-restriction mode when the rotation speed falls below a third set value that is smaller than the second set value in a situation that the operation mode is the restriction possible mode.

* * * * *